United States Patent [19]

Rockburn

[11] Patent Number: 5,816,819
[45] Date of Patent: Oct. 6, 1998

[54] ZODIAC GAME AND METHOD FOR PLAY

[76] Inventor: Patricia Cooper Rockburn, 801 Meadow Creek La., Greensboro, N.C. 27410

[21] Appl. No.: 895,742
[22] Filed: Jul. 17, 1997

Related U.S. Application Data

[63] Continuation-in-part of Ser. No. 753,466, Jul. 29, 1996.
[51] Int. Cl.⁶ .................................................. G09B 19/22
[52] U.S. Cl. .......................................... 434/106; 273/236
[58] Field of Search .................................. 434/106, 128; 273/161, 236

[56] References Cited

U.S. PATENT DOCUMENTS

| 2,549,495 | 4/1951 | Ligntfoot et al. | 273/161 |
| 3,559,995 | 2/1971 | Steadman | 273/161 X |
| 3,746,344 | 7/1973 | Hodan, III | 273/161 X |
| 3,785,654 | 1/1974 | Chambers | 273/249 |
| 4,124,214 | 11/1978 | Pavis | 273/249 |
| 4,359,226 | 11/1982 | Neff | 273/243 |
| 4,579,345 | 4/1986 | Covey | 273/243 |
| 4,778,186 | 10/1988 | Dudley | 273/243 |

FOREIGN PATENT DOCUMENTS 2037591   7/1980   United Kingdom .................. 434/106

Primary Examiner—Jeffrey A. Smith
Attorney, Agent, or Firm—Miller, Sisson, Chapman & Nash, P.C.

[57] ABSTRACT

A game involving the Zodiac and designed to test the players' knowledge regarding astrology. The game includes a game board with a Zodiac design, the game board also having landing spaces or boxes. The game also includes dice and one or more decks of cards. Both the Zodiac design and landing spaces on the game board provide some information about the Zodiac from which questions, located on the cards, may be answered. Dice are thrown and the players move game pieces along the boxes of the game board. Landing in a box may require a player to read information and a question from a card drawn from the deck of cards. The other players are then given the opportunity to answer such questions and receive award tokens in response.

10 Claims, 2 Drawing Sheets

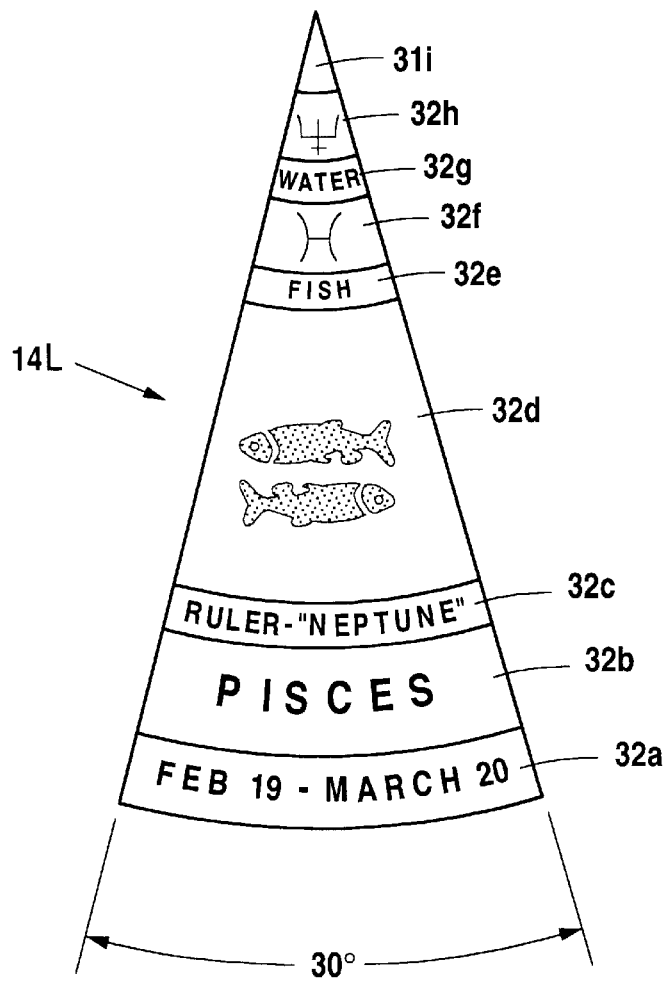
Fig. 7
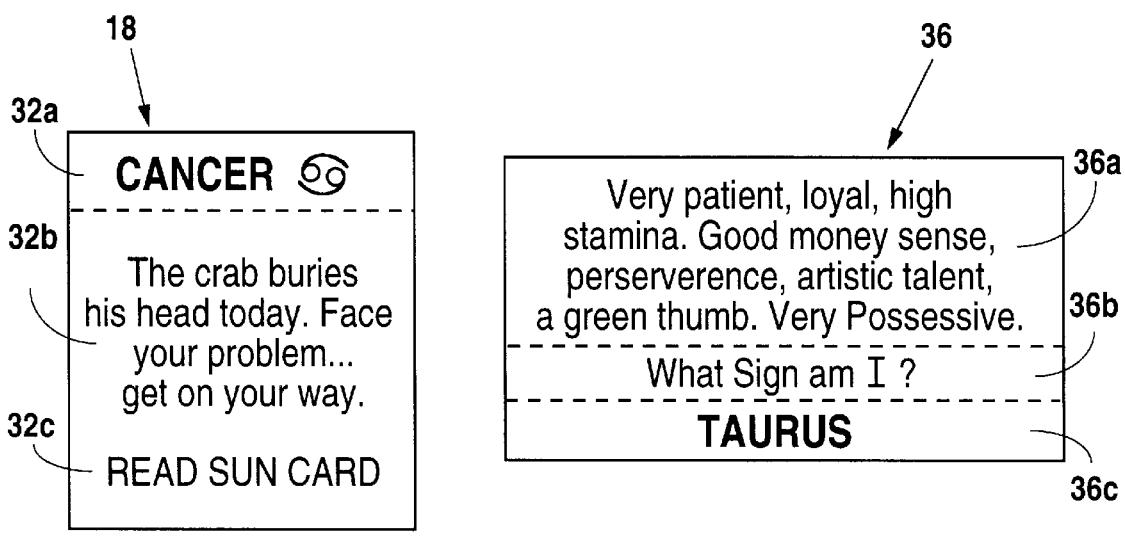
Fig. 8
Fig. 9

ZODIAC GAME AND METHOD FOR PLAY

This application is a continuation-in-part of United States application Ser. No. 08/753,466 filed Jul. 29, 1996.

FIELD OF THE INVENTION

A board game for learning about the zodiac, specifically, a board game with game pieces that are moved in response to the roll of dice and wherein players answer questions and gain tokens for the correct answers.

BACKGROUND OF THE INVENTION

The zodiac is that belt of the heavens that is divided into twelve segments or houses, each segment or house being thirty degrees in width, and each typically represented by one of the twelve signs of the zodiac. Each house or sign of the zodiac is named for a constellation and is represented by dates of the year, as more specifically set forth below. The dates of the year allow one to determine the sign under which they are born. Astrologers use the zodiac to determine, from the position of the sun, moon, planets and stars at a person's birth, the personality traits of that person.

The study of the zodiac is predicated upon the belief that the position and movement of star groups (constellations), the moon, the sun, and the planets may influence our lives. Centuries of astrological study has resulted in an enormous body of beliefs and knowledge relating to birth dates and personality characteristics, movements and position of heavenly bodies and the likelihood of events occurring in one's life. The planets (here including the sun and the moon) have associated with them certain astrological qualities and characteristics, and are related to the various houses or signs of the zodiac. Astrologers believe that the movement of the planets through the zodiac helps determine, along with one's sign, that person's characteristics, nature, and destiny.

Numerous charts and games have been heretofore available which endeavor to assist the user in understanding astrological information and principles. Indeed, it is a purpose of Applicant's novel game apparatus and unique method for playing a zodiac game to provide an amusing, yet informative, manner for imparting to the user some of the basic characteristics regarding the nature of the planets and signs. This is done through the use of an astrological game chart which imparts, through indicia thereon, basic principles and information of astrology condensed in an informative manner and includes the characteristics of the individual houses and planets. The game provides the user with reference material from which to answer a series of questions, thus gaining award tokens, the winner of the game being the player who, when the tokens are completely dispensed with, has the greatest number.

OBJECTS OF THE INVENTION

Thus, it is the object of the present invention to provide for a game apparatus and a unique method of playing the game apparatus which can impart to the user basic fundamental information regarding the nature and characteristics of the planets (including the sun and the moon) and the twelve signs of the zodiac.

It is the further object of the present invention to provide a unique game board having a central portion including a zodiac chart and a perimeter portion including a number of boxes or squares across which the players may move, which game board has indicia thereon from which to find answers to a series of questions regarding the nature and characteristics of the signs and or planets.

It is a further object of the present invention to provide award tokens to players correctly answering questions posed by another player in response to the other player's drawing, reading of a card bearing zodiac information, and a question relating to that information.

These and other objects are further provided for in a unique method of playing the game apparatus, the unique method comprising the steps of: determining an order of play for number of players; each player placing, in order of play, the in player piece at a start box on the game board; each player moving, in response to the operation of the random selection means, through the boxes of the game board to a landing box; each player responding to instructions, if any, on the landing box, at least some of the instructions requiring drawing a card from one of the two sets of cards and reading aloud the information, including a question, thereon; each player answering the questions asked to the group of players by another player in response to the other players responding to instructions in that player's landing box; awarding from the multiplicity of award tokens an award token to each player responding with a correct answer, until all of the multiplicity of tokens are awarded; adding the tokens of each player; and declaring the winner, the winner being the player with the greatest number of award tokens.

SUMMARY OF THE INVENTION

These objects and others are provided for in a game apparatus comprising: a first set of cards, each card of the first set of cards bearing a question about the astrological nature and characteristics of one of the planets, along with astrological information about such planet and the answer to the question; a second set of cards, each card of the second set of cards bearing a question about the astrological nature and characteristics of one of the signs, along with astrological information about such sign and the answer to the question: a game board having a central portion and a perimeter portion, the central portion having a zodiac design bearing indicia thereon and the perimeter portion having a multiplicity of adjacently positioned boxes, at least some of the boxes bearing indicia relating to the astrological nature and characteristics of signs or planets and indicia identifying such signs or planets, and at least some of which boxes bear instructions requiring reading a card; means to randomly select a number from a set of numbers, said random selection means operable by a player; a multiplicity of player pieces for placement on and movement through the multiplicity of boxes on the perimeter portion of said game board; a multiplicity of award tokens for issuing to players; wherein players commence and maintain play by moving player pieces around the perimeter of the board in response to random numbers obtained by the player operating the random selection means and wherein the players are challenged to answer questions read from the cards in an effort to obtain award tokens for correct answers, the cards drawn and read by players in response to instructions on the boxes of the game board in which those players land during game play, wherein clues to the answers to the questions on the cards may be ascertained by reference to indicia on said game board.

This and other objects are further provided for in a unique method of playing the game apparatus, the unique method comprising the steps of: determining an order of play for number of players; each player placing, in order of play, the in player piece at a start box on the game board; each player moving, in response to the operation of the random selection means, through the boxes of the game board to a landing box; each player responding to instructions, if any, on the landing box, at least some of the instructions requiring drawing a card from one of the two sets of cards and reading, out loud, the information including a question thereon; each player answering the questions asked to the group of players by another player in response to the other players responding to instructions in that player's landing box; awarding, from the multiplicity of award tokens, an award token to the first player responding with a correct answer, until all of the multiplicity of tokens are awarded; adding the tokens of each player; and declaring the winner, the winner being the player with the greatest number of award tokens.

BRIEF DESCRIPTION OF THE DRAWINGS

FIG. 7 is a front elevation of view of a pie shaped segment, dissected from the game board of Applicant's game apparatus.

FIG. 8 is a rear elevational view of one of the boxes on the perimeter of a game board of Applicant's game apparatus.

FIG. 9 is a rear elevational view of one of the cards (either a sun card or planet card) from the decks of cards of Applicant's present invention.

DETAILED DESCRIPTION OF THE PREFERRED EMBODIMENT

Figure 1:
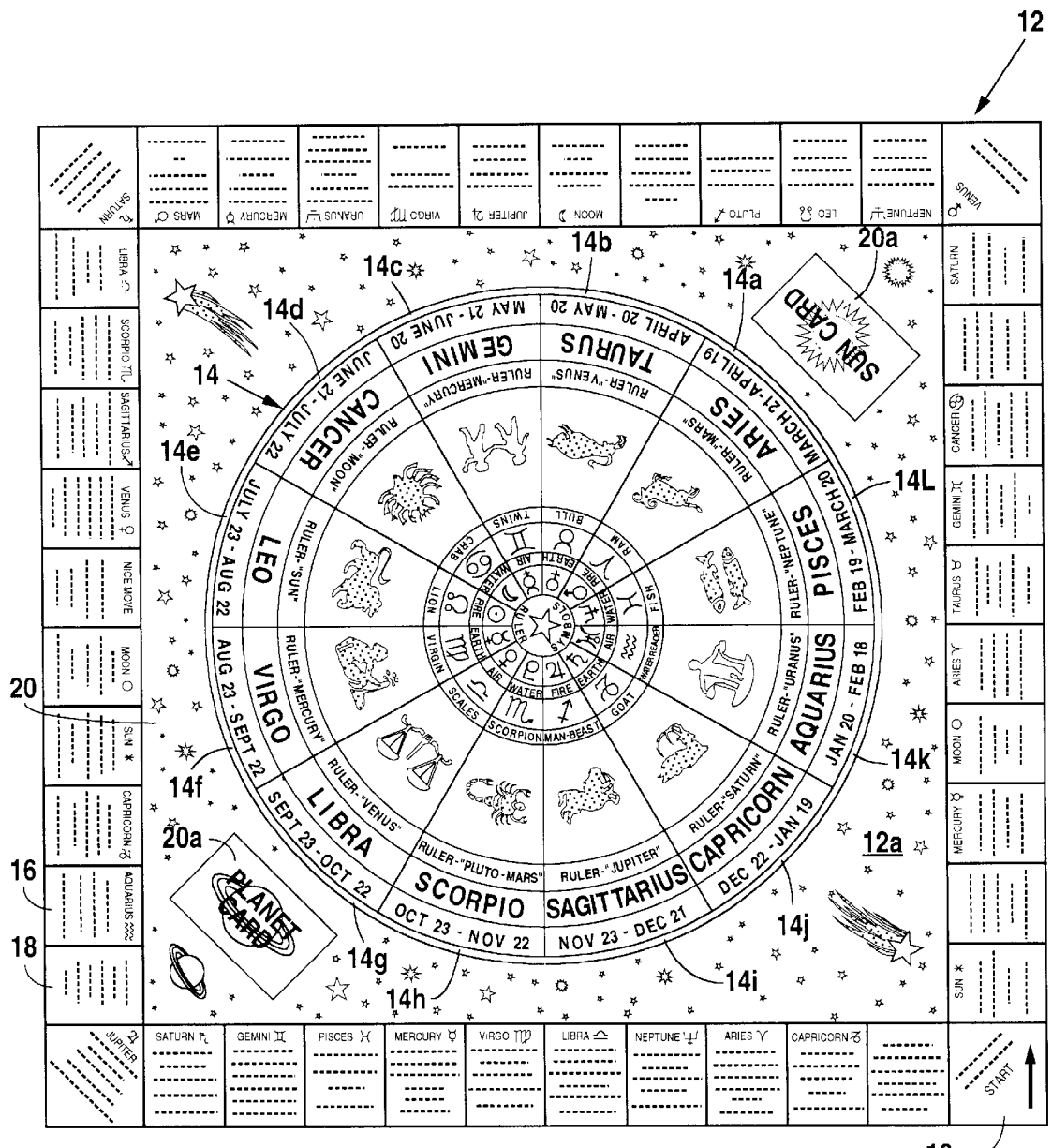
FIG. 1 is a front elevational view of a game board of Applicant's game apparatus.

FIGS. 1–6 illustrate the elements of Applicant's unique game apparatus (10). More specifically, FIG. 1 illustrates a game board (12), typically foldable 24" by 24" square and comprised of stiff cardboard and having a top surface (12a) thereon. The top surface is seen to have a circular central or zodiac design portion (14) broken up into twelve even pie shaped segments (14a–14l). Each of the pie shaped segments is identified by indicia bearing the name of one of the twelve houses or signs of astrology: (14a) Aries; (14b) Taurus; (14c) Gemini; (14d) Cancer; (14e) Leo; (14f) Virgo; (14g) Libra; (14h) Scorpio; (14i) Sagittarius; (14j) Capricorn; (14k) Aquarius; (14l) Pisces. It is seen that these pie segments are 30 degrees in arc and carry design and indicia thereon, reference to which will help allow players to correctly answer questions as set forth in more detail below.

Around the boarder of game border (12) is a perimeter area (16) the perimeter area being comprised of a multiplicity of adjacently located rectangular, spaced apart, perimeter boxes (18) typically about 1½" wide, and including a start box (18a) where play is commenced. The boxes are seen to have indicia thereon relating to playing the game and information helpful in answering questions as set forth more fully below. Last, game board (12) is seen to comprise a background portion (20) located between the central or zodiac design portion (14) and the perimeter boxes (18). The background portion includes a card portion (20a) and a decorative portion, the latter containing decorative material, typically relating to astrology, here, for example, bearing a multiplicity of stars and planet designs against a solid background. Indeed, the entire surface of the game board with all the designs and information thereon is designed to be quite colorful, having a number of different colors, for example perimeter boxes (18) may have a multiplicity of colors and may be color keyed to certain information contained the central portion (14) as set forth more fully below, again such color keying in an effort to make it easier for a player to discern, from information on game board (12) answers to questions.

Figure 2:
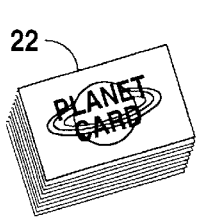
FIG. 2 is a perspective view of a deck of planet cards of Applicant's game apparatus.

Game apparatus (10) includes a deck (22) of planet cards as set forth in FIG. 2, each planet card of deck (22) having a top surface identifying the card as a planet card, and a rear surface with information, as set forth in more detail below. In any case, the information on the rear surface of the planet cards relates to the nature and characteristic of the astrological information relating to planets. There are typically 10 to 50 cards to the deck, optimally 22 planet cards and 24 sun cards.

Figure 3:
FIG. 3 is a side elevational of view of one of a multiplicity of player pieces of Applicant's game apparatus.

FIG. 3 illustrates player pieces, here a player piece (26) made of plastic in the shape of a rocket, for issuance to players for use in moving around the board during the play of the game. There will be a multiplicity of player pieces, typically up to 6 for issuance to the up to six players of the game may accommodate.

Figure 4:
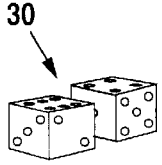
FIG. 4 is a perspective view of a pair of dice of Applicant's game apparatus.

FIG. 4 illustrates the dice (30) of the game apparatus, the dice providing in means for randomly selecting the number of spaces or boxes a player will move in response to the roll of the dice, the movement being movement of the player piece (26) around the perimeter boxes (18) of the game board (12) according to the rules as set forth below. Other means for randomly selecting a number, such as a spinner, may be used in place of dice (30).

Figure 5:
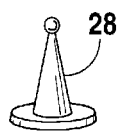
FIG. 5 is a perspective view of an award token of Applicant's game apparatus.

FIG. 5 illustrates a small plastic award token (28), the game typically having anywhere from 30 to 60 award tokens (or any other suitable number), such award tokens being awarded to players in response to providing the correct answer to questions set forth on planet and sun cards according to the rules provided below. The design or shape of the award token is arbitrarily provided for in a cone shaped plastic piece having a base for resting on a flat surface.

Figure 6:
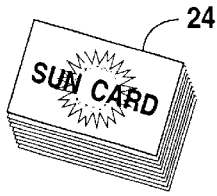
FIG. 6 is a perspective view of a deck of sun cards of Applicant's game apparatus.

FIG. 6 illustrates a deck (24) of sun cards, the deck comprising a multiplicity of cards, each card having a front surface indicating the title and a rear surface providing astrological information relating to an astrological sign as set forth more fully below. It is noted here that the deck (22) of planet cards may be placed in one of card portions (20a) and the deck of sun cards (24) may be placed in a second of card portions (20a) as set forth in FIG. 1.

The central zodiac information indicia bearing portion (14) is provided on the game board to provide quick and easy reference to a variety of information regarding each of the twelve houses or signs of the zodiac, in particular, FIG. 7 is provided to illustrate with one of said segments, here segment Pisces (14l), how the information is correlated and provided to the user. In particular, it is seen that each pie shaped segment, for example Pisces (14l) is separated into a number of areas here (32a–32I). The areas are provided to impart information regarding each sign, more particularly each segment, is provided with areas imparting the following information bearing indicia: dates of the sign (32a); identity of the sign (32b); ruling planet of the sign (32c); picture of the sign (32d); name of the symbol of the sign (32e); astrological symbol for the sign (32f); element of the sign (32g); and symbol for the ruling planet (32h). Section (31i) is provided and typically is part of a larger design such as a star or a compass quadrant, or of a larger identity message as seen in FIG. 1.

Table I (attached) indicates the information to be provided in central portion (14) and how it is segmented to be associated with each of the signs.

It should be understood that other types of information may be provided than is set forth in Table I. However, this information, along with that provided in the perimeter spaces or boxes augmented by the player's own general knowledge is enough to give most non-astrologers or lay persons a reasonable chance at determining a correct response. However, for more advanced levels of play the question on the deck cards may be more difficult or the information and/or the game board more esoteric.

FIG. 8 illustrates an example of one of the perimeter boxes (18) or spaces provided around the perimeter of game board (12). Specifically with reference to FIG. 8, it is seen that each of the boxes may be divided into three areas, (32a–32c). Area (32a) typically located at the top portion of the box is a title bearing portion in which the name and/or the symbol of the planet and/or sign is placed. There are typically about 44 spaces and there are only 11 planets (sun and moon counted as planets) and twelve signs, so the title of a box may be duplicated in another or in a few boxes. In some boxes the title may be absent entirely (see FIG. 1), but the majority of boxes have titles. In addition to the title indicia bearing the name of one of the signs or planets, area (32a) may also contain the symbol of the sign or planet. For the sake of illustration, (32a) contains only the title, again for sake of illustration the title "Cancer".

The main or central area of box (18) is a message bearing area (32b) which provides words describing the nature and/or characteristic of the sign or planet identified in title area (32a). Here, as an example, message bearing area carries this message: "The crab buries his head today face your problem . . . get on your way." The information imparted in this area is designed to help give clues to help with reference to the game board, answer the question on the card and gain tokens as set forth more fully below. In one preferred embodiment this information has internal meter or rhyme here, for example, as with the word "today" rhyming with "your way". In any case, the message bearing portion is important for the players to read as it will help them answer the questions.

The last portion or area of each box is the instruction bearing area (32c) which instructs the player landing on that box to take action, here for example to "read sign card". Other information in the instruction bearing area may command the player landing in that box to "go back to three boxes" or spaces, read symbols, return to "a given box", throw dice again, read any card, etc. The point is, the instruction bearing portion (32c) of box (18) requires the player take some action, sometimes the action being reading a card to the other players as set forth more fully below. Most, but not all, boxes contain a title area (32a) or instruction area (32c). In an alternative embodiment, all boxes contain a title and instructional information.

Typically, all segments belonging to the same element are the same color, which is a different color from the other elements. For example, Libra, Aquarius and Gemini belong to the element air and all of the words, letters, symbols and other indicia in those pie segments would be blue (or some other color) against a common (for example, white) background color. Further, the boxes on the perimeter of the game board that carry the titles of Libra, Gemini and Aquarius and information regarding that sign and the planet that rules it would typically also be blue. It is noted that zodiac portion (14) is a flat chart and does not pertain to any individual nor is it used for determining horoscopes.

FIG. 9 illustrates the organization of the back of the sun and planet cards, indicating that the back of the cards is broken up into three areas (36a, 36b, 36c). The main portion of the card is the information bearing portion (36a) which carries a message imparting information regarding the nature and characteristics of either a sign or planet (depending on whether it is a sun or planet card). Here, for example, information bearing area (36a) of a sun card (36) describes the following nature and characteristic of a sign: "Very patient, loyal, high stamina. Good money sense, perseverance, artistic talent and a green thumb. Very possessive". The next portion of card (36) is a question bearing portion, here designated (36b). Simply put, the question bearing portion provides for the reader a question to read to the other players, who, will in turn attempt to determine the correct answer. Last area of card (36) contains an answer (36c) to the question asked in question bearing portion (36b). For example, (36b) asks the players "what sign am I?" This question is read following the information provided in information area (36a). Following reading the question, the players (except the one reading the question) attempt to, with reference to game board (12) and their accumulating knowledge of the zodiac, ascertain the correct sign. Award tokens (28) are provided following the polling of the quizzed players to ascertain those determining the correct answer here "Taurus". Typically, only the first player to offer the correct response is awarded an Earth token. In the alternative, any player providing the correct response will receive a token. Further, in one embodiment, additional information or clues to the answer may be read after the question. This helps reinforce the player's knowledge, and the reader should finish reading all information on the card before the player responds with an answer.

With knowledge of the apparatus, we will now turn to how the game is played.

RULES OF THE GAME

Object of the game: Obtain as many award tokens, the award tokens received for providing the correct answers to questions about the zodiac.

Any number of players from 2 to 6 may play. Before commencing play the board is opened up on a flat surface and the two decks of cards are placed title side up (information side down) in their respective places on the game board. Each player selects one player piece and the dice is rolled to see who will begin play first. The player rolling the highest will go first. The players will then proceed, typically in counter-clockwise order.

Play is commenced with all the players' tokens in the start box (18a). The players, in turn, roll the dice and move their player pieces in the direction of the arrow the same number of spaces or boxes that show on the dice. When the player lands on his landing box he follows the instructions, if any, found in the box. If the instructions require reading a card, the player removes the topmost card of the designated card stack—either a sun card or a planet card. On the backside of the card the player reads all the information to the other players then poses the question to them and may, in an alternate embodiment, read even more information. Following the reading of the question, the reader polls, individually, each player, in turn, for that player's response to the question. After the last player is polled, the reader determines if anyone has responded correctly and, if not, returns the card to the bottom of the deck without giving the correct answer; otherwise the reader announces the answer and awards an award token from the token bank to each player giving the correct answer. In the alternative, only the first player to announce the correct answer receives an award token. If this alternative rule is used, then the players may call out an answer (but only one) at any time; but the reader must finish reading the card in its entirety before responses are offered.

Following reading, the card is then returned to the bottom of the deck. The players proceed, as above, in turn, until the final award token is given and there are no more award tokens left. At this point, the game ends. The player with the most award tokens is the winner.

Two or more players may occupy the same space at one time. Players may only give one answer to each question. Players may form teams, with the individuals on a team alternating in turn with the individuals of another team. For example, Team I is comprised of players A+C, Team II having players B+D. Team players could consult, but could provide only one answer as a team. Award tokens would be received as a team and counted as a Team with the winning team having the most tokens. In the alternative, the players may decide, before hand, to play to a given time limit and determine the winner after the time has concluded.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

TABLE I

| | | | | Information Portions | | | | |
|---|---|---|---|---|---|---|---|---|
| | 32a | 32b | 32c | 32d | 32e | 32f | 32g | 32h |
| 14a | March 21–April 19 | Aries | Mars |  | Ram |  | Fire |  |
| 14b | April 20–May 20 | Taurus | Venus |  | Bull |  | Earth |  |
| 14c | May 21–June 20 | Gemini | Mercury |  | Twins |  | Air |  |
| 14d | June 21–July 22 | Cancer | Moon |  | Crab |  | Water |  |
| 14e | July 23–Aug 22 | Leo | Sun |  | Lion |  | Fire |  |
| 14f | Aug 23–Sept 22 | Virgo | Mercury |  | Virgen |  | Earth |  |
| 14g | Sept 23–Oct 22 | Libra | Venus |  | Scales |  | Air |  |
| 14h | Oct 23–Nov 22 | Scorpio | Pluto–Mars |  | Scorpian |  | Water |  |
| 14i | Nov 23–Dec 21 | Sagittarius | Jupiter |  | Man–Beast |  | Fire |  |
| 14j | Dec 22–Jan 19 | Capricorn | Saturn |  | Goat |  | Earth |  |
| 14k | Jan 20–Feb 18 | Aquarius | Uranus |  | Water Bearer |  | Air |  |
| 14l | Feb 19–March 20 | Pisces | Neptune |  | Fish |  | Water |  |

What is claimed is:

1. A game apparatus comprising:
   a first set of cards, each card of the first set of cards bearing a question about the astrological nature and characteristics of one of the planets, along with astrological information about such planet and the answer to the question;
   a second set of cards, each card of the second set of cards bearing a question about the astrological nature and characteristics of one of the signs, along with astrological information about such sign and the answer to the question;
   a game board having a central portion and a perimeter portion, the central portion having a zodiac design bearing indicia thereon and the perimeter portion having a multiplicity of adjacently positioned boxes, at least some of the boxes bearing indicia relating to the astrological nature and characteristics of signs or planets and indicia identifying such signs or planets, and at least some of which boxes bear instructions requiring rearing one of the cards from one of said first or said second set of cards;
   means to randomly select a number from a set of numbers, said random selection means operable by a player;
   a multiplicity of player pieces for placement on and movement through the multiplicity of boxes on the perimeter portion of said game board; and
   a multiplicity of award tokens for issuing to players;
   wherein players commence and maintain play by moving player pieces around the perimeter of the board in response to random numbers obtained by the player operating the random selection means and wherein the players are challenged to answer questions read from the cards in an effort to obtain award tokens for correct answers, the cards drawn and read by players in response to instructions on the boxes of the game board in which those players land during game play, wherein clues to the answers to the questions on the cards may be ascertained by reference to indicia on said game board.

2. The game apparatus of claim 1, wherein the zodiac design bearing indicia includes indicia identifying each of the twelve signs, the ruling planet for such sign and the dates of such signs.

3. The game apparatus of claim 2, wherein the zodiac design is circular and broken up into twelve pie shape segments, each pie shape segment providing indicia thereon including indicia identifying a sign, a ruling planet and the dates of such signs.

4. The game apparatus of claim 3, wherein each of the pie shaped segments further contain information identifying the element associated with the sign, the symbol for the sign and the symbol for the ruling planet and further including a picture of the sign.

5. The game apparatus of claim 4, wherein each of the pie shaped segments is one of four different colors, each color corresponding to one of the four elements of the sign of the segment.

6. The game apparatus of claim 1, wherein the indicia relating to the nature and characteristics of the sign and planets includes indicia identifying the names and symbols of such signs or planets.

7. The game apparatus of claim 1, the game board further comprising a background portion, the background portion located between the perimeter and the central portion and having thereon a first portion for placement of the first set of cards thereon and a second portion for placement of the second set of cards thereon.

8. The game apparatus of claim 7, wherein the background portion further includes a multiplicity of designs of stars thereon.

9. The game apparatus of claim 1, wherein means to randomly select include a pair of dice.

10. A method of playing an astrological game with more than one player, the method including the steps of:

provliding a first set of cards, each card of the first set of cards bearing a question about the astrological nature and characteristics of one of the planets, along with astrological information about such planet and the answer to the question; a second set of cards, each card of the second set of cards bearing a question about the astrological nature and characteristics of one of the signs, along with astrological information about such sign and the answer to the question; a game board having a central portion and a perimeter portion, the central portion having a zodiac design bearing indicia thereon and the perimeter portion having a multiplicity of adjacently positioned boxes, at least some of the boxes bearing indicia relating to the astrological nature and characteristics of signs or planets and indicia identifying such signs or planets, and at least some of which boxes bear instructions requiring reading a card; means to randomly select a number from a set of numbers, said random selection means operable by a player; a multiplicity of player pieces for placement on and movement through the multiplicity of boxes on the perimeter portion of said game board; and a multiplicity of award tokens for issuing to players;

determining an order of play for the number of players;

each player placing, in order of play, a player piece at a start box on the game board;

each player moving, in response to the operation of the random selection means, through the boxes of the game board to a landing box;

each player responding to any instructions on the landing box, at least some of the instructions requiring drawing a card from one of the two sets of cards and reading aloud the information, including a question, thereon;

each player answering the questions asked to the group of players by another player in response to the other players responding to instructions in that player's landing box;

awarding from the multiplicity of award tokens an award token to each player responding with a correct answer, until all of the multiplicity of tokens are awarded;

adding the tokens of each player; and declaring the winner, the winner being the player with the greatest number of award tokens.

\* \* \* \* \*